United States Patent
Saito et al.

(10) Patent No.: US 9,817,982 B2
(45) Date of Patent: Nov. 14, 2017

(54) IDENTITY AUTHENTICATION SYSTEM

(71) Applicant: Kabushiki Kaisha Toshiba, Tokyo (JP)

(72) Inventors: Hiroo Saito, Tokyo (JP); Hiroshi Sukegawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/514,577

(22) Filed: Oct. 15, 2014

(65) Prior Publication Data

US 2015/0113632 A1    Apr. 23, 2015

(30) Foreign Application Priority Data

Oct. 22, 2013 (JP) ................................. 2013-219518

(51) Int. Cl.
- *G06F 21/60* (2013.01)
- *G06K 9/00* (2006.01)
- *G06F 21/32* (2013.01)

(52) U.S. Cl.
CPC ............ *G06F 21/604* (2013.01); *G06F 21/32* (2013.01); *G06K 9/00288* (2013.01); *G06K 9/00906* (2013.01)

(58) Field of Classification Search
CPC ... G06F 21/604; G06F 21/32; G06K 9/00221; G06K 9/00906; G06K 9/00288
USPC .............................. 726/16, 17; 713/186, 502
See application file for complete search history.

(56) References Cited

U.S. PATENT DOCUMENTS

| | | | |
|---|---|---|---|
| 8,335,927 B2 | 12/2012 | Niinuma | |
| 8,856,541 B1 * | 10/2014 | Chaudhury | ............. G06F 21/32 382/115 |
| 2012/0075452 A1 * | 3/2012 | Ferren | ................ G02B 13/0065 348/78 |

(Continued)

FOREIGN PATENT DOCUMENTS

| | | |
|---|---|---|
| JP | 2004-013831 A | 1/2004 |
| JP | 2006-099614 A | 4/2006 |

(Continued)

OTHER PUBLICATIONS

Efficient adaptive face recognition systems based on capture conditions, IEEE 2014, Pagano et al, 10.1109/CIBIM.2014.7015444.*

(Continued)

*Primary Examiner* — Jahangir Kabir
(74) *Attorney, Agent, or Firm* — Baker Botts L.L.P.

(57) ABSTRACT

According to one embodiment, an identity authentication system includes a detecting unit that detects an identity theft by determining whether a photographing target is a living body or a non-living body, a collating unit that performs identity collation based on a photographed image, and a control unit that controls execution timing of a detection process performed by the detecting unit and an identity collating processing performed by the collating unit and, in a case where the detection performed by the detecting unit is performed for a first number of times, performs the collation process performed by the collating unit, wherein the first number of times is set in consideration of a tradeoff between a required intensity of security and convenience of a user using the identity authentication system.

13 Claims, 7 Drawing Sheets

(56) References Cited

U.S. PATENT DOCUMENTS

| | | | |
|---|---|---|---|
| 2012/0140993 A1* | 6/2012 | Bruso | G06K 9/00899 382/118 |
| 2013/0039547 A1* | 2/2013 | Liu | G06K 9/00288 382/115 |
| 2013/0326613 A1* | 12/2013 | Kochanski | G06F 21/32 726/19 |
| 2014/0109200 A1* | 4/2014 | Tootill | G06F 21/32 726/5 |
| 2014/0292480 A1* | 10/2014 | Brangoulo | G06K 9/00221 340/5.53 |
| 2016/0055327 A1* | 2/2016 | Moran | G06F 21/32 726/19 |
| 2017/0068961 A1* | 3/2017 | Cox | G06Q 20/10 |

FOREIGN PATENT DOCUMENTS

| | | |
|---|---|---|
| JP | 2006-330936 A | 12/2006 |
| JP | 2007-004767 A | 1/2007 |
| JP | 2007-148968 A | 6/2007 |
| JP | 2008-009821 A | 1/2008 |
| JP | 2009-294780 A | 12/2009 |
| JP | 2012-089063 A | 5/2012 |
| JP | 2012-118985 A | 6/2012 |

OTHER PUBLICATIONS

An user identity authentication scheme adaptive to changes in face appearance, IEEE 2011, Ribeiro et al, 10.1109/IMTC.2011.5944056.*

Fukui, Kazuhiro et al., "Facial Feature Point Extraction Method Based on Combination of Shape Extraction and Pattern Matching."

Fukui, Kazuhiro, et al., "Face Recognition System Using Temporal Image Sequence".

Maeda, Kenichi et al., "Subspace Method of Pattern Recognition."

Oja, Erkki, "Subsapce Methods of Pattern Recognition" (1986).

* cited by examiner

NUMBER n (t) OF DETECTION OF IDENTITY THEFTS

NUMBER n (t) OF DETECTION OF IDENTITY THEFTS

| USER ID | USE DATE | USE TIME | PLACE OF USE | IDENTITY THEFT DETECTING RESULT | ACCUMULATED NUMBER OF DETECTIONS |
|---|---|---|---|---|---|
| 000000 | 2013/04/01 | 00:00:00 | FUCHU-SHI, TOKYO** | ○ | 100 |
| 000000 | 2013/04/01 | 00:00:01 | OSAKA** | ○ | 101 |
| 000001 | 2013/05/10 | 12:30 | BUNKYO-KU, TOKYO** | × | 0 |
| 000001 | 2013/05/25 | 13:00 | BUNKYO-KU, TOKYO** | × | 0 |
| ... | | | | | |

2013/04/01 00:00:00
PHOTOGRAPH IDENTITY THEFT DETECTION 1
COLLATION RESULT USER 000000

2013/04/01 00:00:01
PHOTOGRAPH IDENTITY THEFT DETECTION 2
COLLATION RESULT USER 000000

2013/03/01 12:00:00
COLLATION RESULT USER 000002
COLLATION RESULT USER 000003 (SUPERVISOR)

IDENTITY AUTHENTICATION SYSTEM

CROSS-REFERENCE TO RELATED APPLICATION

This application is based upon and claims the benefit of priority from Japanese Patent Application No. 2013-219518, filed on Oct. 22, 2013; the entire contents of which are incorporated herein by reference.

FIELD

Embodiments described herein relate generally to an identity authentication system.

BACKGROUND

Recently, identity authentication using biological information has attracted attention in an electronic commerce and the like. Different from a system performing biological authentication at a determined place like an access control apparatus installed to a specific facility, time or a place is not selectable in identity authentication that is performed through a mobile terminal such as a portable telephone or a PC. Accordingly, there is a problem in that, by obtaining biological information (for example, a facial photograph in the case of facial image recognition or the like), passing off as a registered person can easily be performed. Accordingly, methods and apparatuses for detecting identity theft have been proposed. For example, in a countermeasure for an identity theft, the security is configured to be strict by consecutively performing identity authentication.

However, in a case where identity authentication is configured to be repeated for strengthening the security, erroneous detection such as an authentication failure may easily occur. Accordingly, there are problems in that user's convenience is degraded and resources for calculation are wasted (as a result, the convenience is degraded). As above, in an identity authentication system, by only configuring the security to be strict, there is a problem in that the convenience is degraded. Accordingly, it is preferable to achieve both the strengthening of security and the maintenance of convenience.

BRIEF DESCRIPTION OF THE DRAWINGS

FIG. 5 is a diagram that illustrates a case where a facial image is acquired by requesting a person who is an identity authentication target to perform an operation for a face direction for photographing or the like;

DETAILED DESCRIPTION

According to one embodiment, there is provided ??????

First Embodiment

Figure 1:
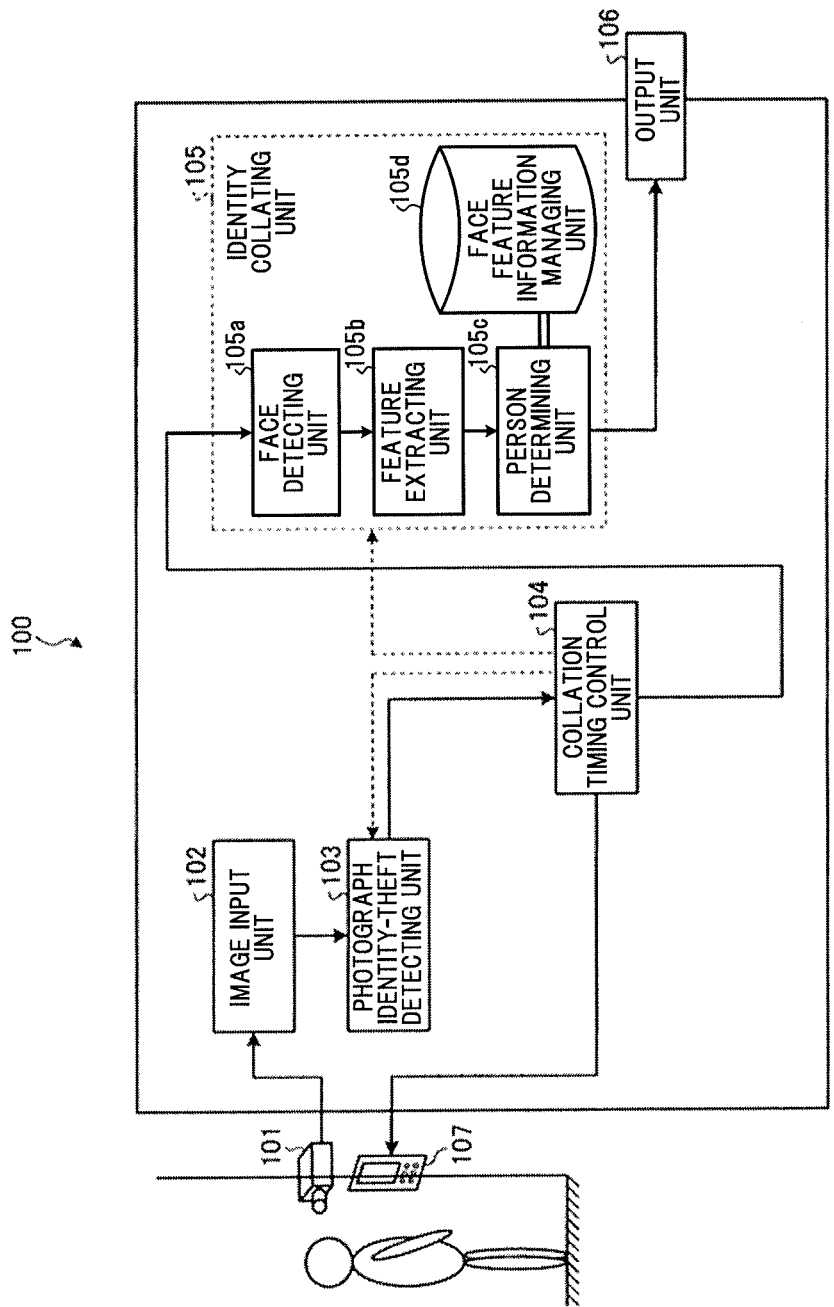
FIG. 1 is a block diagram that illustrates the configuration of an identity authentication system according to a first embodiment.

FIG. 1 is a block diagram that illustrates the configuration of an identity authentication system 100 according to a first embodiment.

In the identity authentication system 100, an image input unit 102 is a means for inputting a face image, which is captured by a camera 101, of a person who is an authentication target. An input image signal is converted into a digital signal by an A/D converter (not illustrated in the figure) and is output to a photograph identity-theft detecting unit 103 that is disposed at the rear end thereof. In addition, in a case where a face image is input by a mobile terminal such as a portable telephone, as the camera 101 and the image input unit 102, a camera function provided in the mobile terminal may be used. Here, the camera 101 may be installed to a fixed portion of a specific facility.

The photograph identity-theft detecting unit 103 determines whether or not an input face image is non-biological information such as a photograph. This determination, for example, may be made using a technique disclosed in Japanese Patent Application OPI Publication No. 2006-099614. In addition, in case of a means capable of detecting that a face image is not according to a living body, any technology may be employed. A detection result is output to a collation timing control unit 104 that is disposed at the rear end thereof.

A collation timing control unit 104 controls timing (the flow of the process) at which an identity authentication process (a photograph identity-theft detecting process and an identity collating processing) is performed for identity verification for the photograph identity-theft detecting unit 103 and an identity collating unit 105 based on the determination result acquired by the photograph identity-theft detecting unit 103. In addition, a guide and the like relating to the identity authentication are displayed on a display/operation unit 107, and a predetermined operation is received.

The identity collating unit 105 is configured by a face detecting unit 105a, a feature extracting unit 105b, a face feature information managing unit 105d, and a person determining unit 105c.

The face detecting unit 105a acquires a correlation value between an input image and each template while moving templates for face detection, which are prepared in advance, within the input image and extracts a position at which the correlation value is the highest as a face area. The extraction of a face area may be also realized by a face extraction method using a known eigen space method, a subspace method, or the like. In addition, the face detecting unit 105a detects positions of facial parts such as eyes and a nose from the portion of the detected face area. The detection method may be realized according to a method disclosed in Literature 1 (Kazuhiro FUKUI and Osamu YAMAGUCHI: "Facial Feature Point Extraction Method Based On Combination Of Shape Extraction And Pattern Matching", The institute Electronics, Information and Communication Engineers Journal (D-II), vol J80-D-II, No. 8, pp 2170-2177 (1997)) or the like.

The feature extracting unit 105b outputs feature information (hereinafter, referred to as face feature information) used for identifying a person based on information (the position of the face portion) of the face area as numerical values. The feature extracting unit 105b, first, cuts out the face area into areas having a fixed size and a fixed shape based on the position of the face area detected by the face detecting unit 105a and uses the shading information thereof as face feature information. Here, the shading value of the area of m pixels×n pixels is used as a feature vector of m×n dimensions.

Alternatively, as disclosed in Literature 2 (JP 2007-004767 A), it may be configured such that a 3-D model is generated for one piece of face image information, a plurality of face pattern images acquired by intentionally changing the direction and the state of the face are generated, known K-L expansion is performed by regarding the face pattern images as a feature vector having pixel values as its elements, and an acquired normalized orthogonal vector is set as face feature information (feature vector) of a person corresponding to the input image. In a case where features of a face are acquired from one image, the face feature extracting process is completed through the process described up to here.

As another technique, an identity collating processing may be performed using a moving image that is configured by a plurality of consecutive images for the same person. More specifically, a mutual subspace method can be used which is disclosed in Literature 3 (Kazuhiro FUKUI, Osamu YAMAGUCHI, and Kenichi MAEDA "Face Recognition System using Temporal Image Sequence", The Institute of Electronics, Information and Communication Engineers Research Report PRMU, vol. 97, No. 113, pp 17-24 (1997)) and Literature 4 (Kenichi MAEDA and Sadakazu WATANABE "Subspace Method of Pattern Recognition", The Institute of Electronics, Information and Communication Engineers Journal (D), vol. J68-D, No. 3, pp 345-352 (1985)). According to such a technique, a subspace representing the features of a face can be calculated based on consecutive images.

Feature information such as a feature vector or a subspace acquired using the above-described technique is set as face feature information of a person for the face detected from the input image.

The face feature information managing unit 105d is a database that is used in a case where a similarity index is calculated by the person determining unit 105c to be described later and manages the face feature information output by the feature extracting unit 105b for each person who is a collation target. The information managed by the face feature information managing unit 105d may manage auxiliary information of a corresponding person such as a face image, a name, sex, age, a height, and the like in association with each face feature information for easy understanding of the supervisor or the like. In addition, a content that is actually managed as the face feature information may be data output from the feature extracting unit 105b, a correlation matrix (in more detail, Literature 5 (written by Oja ERKKI, translated by Hidemitsu OGAWA and Makoto SATO, "Subspace Methods of Pattern Recognition", Industrial Book, 1986) immediately before the calculation of the feature vector or the subspace described above and the like, or the like.

The person determining unit 105c calculates a similarity index between the face feature information of the input image that is acquired by the feature extracting unit 105b and the face feature information of the face feature information managing unit 105d that corresponds to the authentication target.

As the similarity index, based on information of the feature vector or the subspace that is managed as the face feature information, a degree of similarity representing the similarity between two feature vectors according to a simple similarity method or a degree of similarity between subspaces according to the subspace method is used.

In addition, for the calculation of the degree of similarity as a similarity index, a method such as a multiple similarity method other than the above-described methods may be used. According to such a method, both data for an identity collation among registration information registered in advance and data input for an identity collation are represented as subspaces that are calculated based on a plurality of images. An "angle" formed by these two subspaces is defined as a degree of similarity and is set as a similarity used for an identity collation. A specific calculation method may be realized according to the technique of Literature 1 introduced in the description of the feature extracting unit 105b described above.

In addition, it is apparent that, as a similarity index other than the above-described degree of similarity, a distance between a face feature that is based on an input image and face feature information among the registration information in a feature space or a Mahalanobis distance may be used. In a case where the distance is used, the larger the numerical value becomes, the lower the degree of similarly is. Accordingly, in a comparison with a threshold used for a collation determination, as the numerical value becomes smaller than the threshold, a degree of similarity for a registered person is higher.

Figure 10:
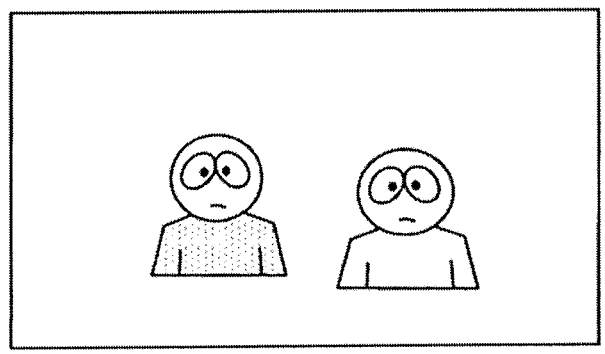
FIG. 10 is a diagram that illustrates an example of a collation result of a case where one predetermined person or a plurality of supervisors and the like and a person who is an identity authentication target are simultaneously photographed, and an identity collation is simultaneously performed.

In addition, by using an image (FIG. 10) configured by a plurality of persons including a person such as a supervisor who is known as the same person in advance as the input image, the accuracy of the similarity index can be improved. In such a case, the number of supervisors or the like who are necessary for the identity collation may be increased or decreased in accordance with the resolution of the input image and the required intensity of security.

The person determining unit 105c determines similarity with a registered person by comparing the calculated similarity index (degree of similarity) with a predetermined threshold and outputs a result of the determination to an output unit 106.

The output unit 106 outputs the result of the determination that is acquired by the person determining unit 105c and the like to an external apparatus.

In the above-described configuration, in a case where a mobile terminal such as a portable telephone is used, the image input unit 102, the photograph identity-theft detecting unit 103, the collation timing control unit 104, the face detecting unit 105a, and the feature extracting unit 105b are disposed on the mobile terminal side and are realized by using the function of the mobile terminal. In addition, the person determining unit 105c, the face feature information managing unit 105d and the output unit 106 are disposed on the server side and are realized by using the function of the server. In such a case, between the feature extracting unit 105b and the person determining unit 105c, a network of the portable telephone or the like, which is not illustrated in the figure, and a communication interface corresponding thereto are disposed. On the other hand, in a case where the identity authentication system 100 is disposed at a specific facility, each unit of the system described above is disposed in an information processing apparatus such as a server and is realized by using the function of the information processing apparatus. However, each unit of the system may be configured as a dedicated device.

However, in a case where the identity-theft for a person who is the identity authentication target is repeatedly detected by the photograph identity-theft detecting unit 103, it is preferable to set the security to be strict. On the contrary, in a case where the frequency of the identity-theft is low, the security may be set to be low as that much. For the repeating of an identity theft behavior, for example, the collation timing control unit 104 acquires the number of identity thefts per unit time by counting the number of identity thefts within a predetermined time. Then, in a case where the number of identity thefts per unit time is more than a predetermined threshold, a setting for configuring the intensity of security to be strict is used. Alternatively, the number of times of detection may be counted by increasing a counter using the collation timing control unit 104 in a case where the photograph identity-theft detecting unit 103 determines an identity theft and decreasing the counter using the collation timing control unit 104 in a case where the photograph identity-theft detecting unit 103 determines no identity theft. In such a case, when the number of times of detection becomes a predetermined positive value (threshold value), the photograph identity-theft detecting unit 103 changes the setting for increasing the intensity of security.

Figure 2:
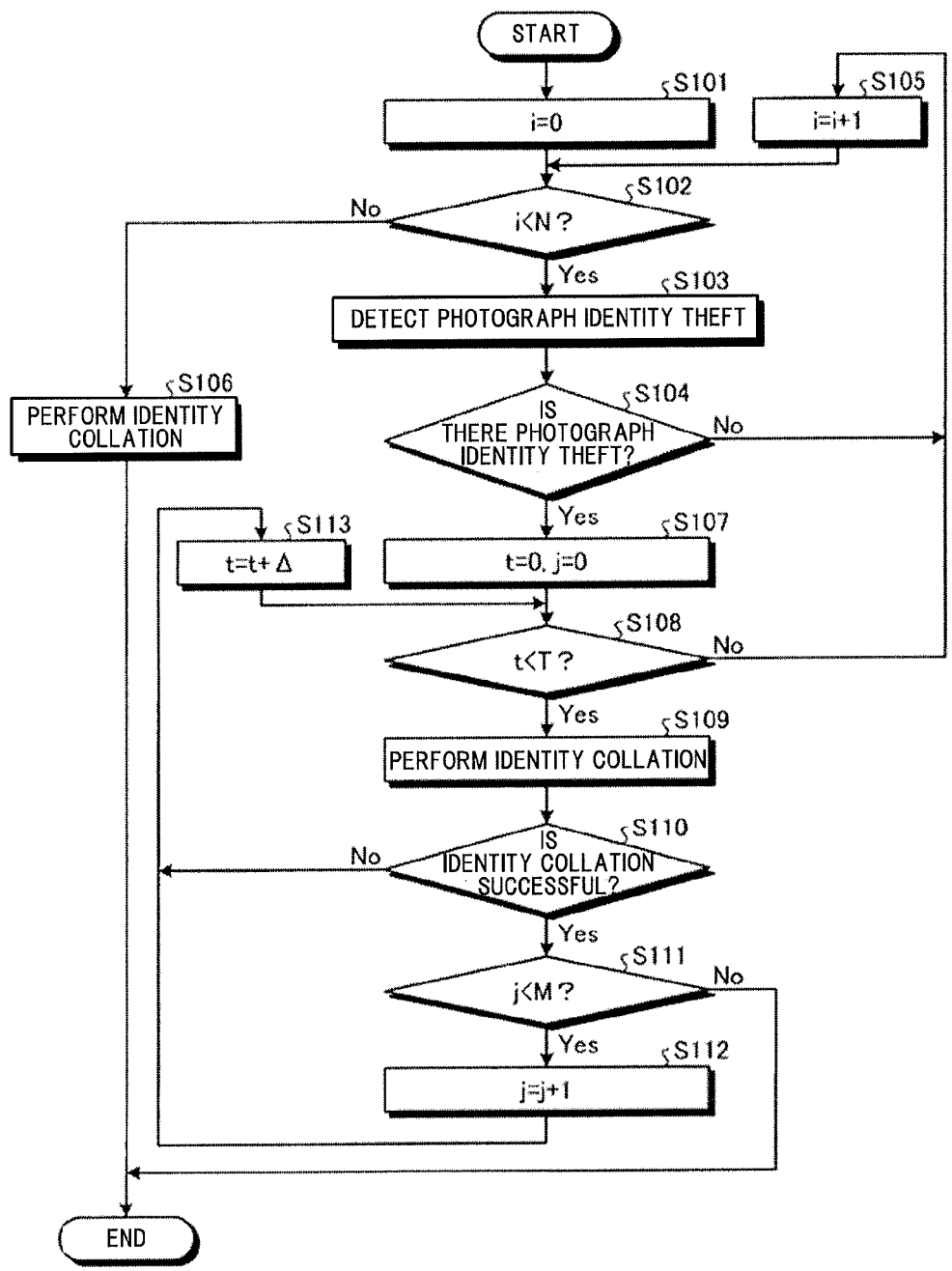
FIG. 2 is a flowchart that illustrates the processing flow of an identity authentication process according to a control process performed by a collation timing control unit.

Here, the processing flow of the identity authentication process according to the control of the collation timing control unit 104 will be described. FIG. 2 is a flowchart that illustrates the processing flow.

The example illustrated in FIG. 2 is an operation example in which a predetermined number of times of detection of an identity theft is performed, normal identity collating processing is performed in a case where any identity theft is not detected, and, also in a case where an identity theft is determined, the identity collating processing is continuously performed, and the identity collating processing up to a predetermined number of times and a predetermined time and detection of an identity theft up to a predetermined number of times are controlled so as to be repeated. According to such a control process, even in a case where erroneous detection of an identity theft occurs, identity verification is performed, and the security can be strengthened. In addition, the example illustrated in FIG. 2 is an example in which, a tradeoff between the required intensity of security and the convenience of the user using the identity authentication system 100 can be adjusted in accordance with the frequency of the identity theft with the predetermined number of times and the predetermined time being used as parameters of which the setting can be changed (to be described later).

As illustrated in FIG. 2, in this embodiment, until the number of times of repeating of the identity verification is a threshold N or more, the process of Steps S102 to S105 and the process of Steps S107 to S113 are repeated. Then, in a case where an identity theft has not been detected consecutively for N times (No in Step S102), the identity collating processing is performed by the identity collating unit 105 (Step S106). On the other hand, in a case where an identity theft is detected (Yes in Step S102) for i<N (Yes in Step S102), the process is performed as below. Here, i described above is initialized to "0" in Step S101.

In a case where, in the photograph identity theft detecting process (Step S103) performed by the photograph identity-theft detecting unit 103, an input image input to the image input unit 102 is determined to be a photograph identity theft (Yes in Step S104), until a total processing time t of the identity collating processing arrives at a threshold T (seconds) (until No is determined in Step S108) or while the number of times j of successful identity collating is less than a threshold M (while Yes is determined in Step S111), "1" is added to j (Step S112), an interval $\Delta$ (to be described later) at which the identity collating processing is performed is added to t (Step S113), and the identity collating processing (Step S109) is repeated. On the other hand, in a case where the input image is determined not to be a photograph identity theft (No in Step S104), "1" is added to i in Step S105, and the process is returned to Step S102. Here, t and j described above are initialized to "0" in Step S107.

In a case where the number of times j of successful identity collating processing is the threshold M in Step S109 (No in Step S111), the identity collation is determined to be successful, and a series of the processes ends. In a case where the total processing time t of the identity collating processing arrives at the threshold T [seconds] before the number of times j of successful identity collating is the threshold M (No in Step S108), "1" is added to i in Step S105 as time out (Step S105), then, the process is returned to Step S102, and the identity theft detection performed by the photograph identity-theft detecting unit 103 is performed again (Step S103).

At a time point when the process is returned to Step S102, in a case where the determination process of Step S102 is repeated N times (No in Step S102), the identity collating processing is performed in Step S106. The collation timing control unit 104 controls the flow of the process as below. In addition, in a case where the identity collating processing (Step S109) of M times is not successful, and the process of Step S102 to S105 and Step S107 to S113 is repeated N times, and the process proceeds to the identity collating processing of Step S106, generally, similar to the identity collating processing of Step S109, the identity collating in this step is not successful.

In addition, when the detection of an identity theft and the identity collating, which are repeated as described above, are performed, it is preferable to use another image among a plurality of input images instead of the same image. Furthermore, the interval $\Delta$ [seconds] at which the identity collating processing is performed, for example, is determined as $\Delta=(t1+ \ldots +tM)/M$ based on statistical information t1, ..., tM [seconds] of time required for the collating processing of M times. Here, the initial values of the parameters N, T, M, and $\Delta$ are set in advance.

Figure 3A:
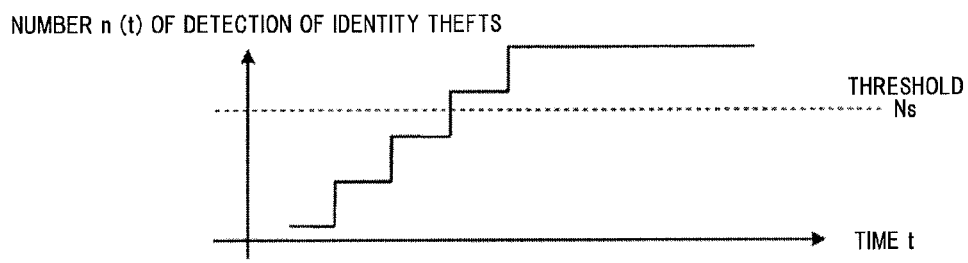
FIGS. 3(A) and 3(B) are diagrams that illustrate the frequency of the identity authentication process of a case where an identity theft is detected.
Figure 3B:
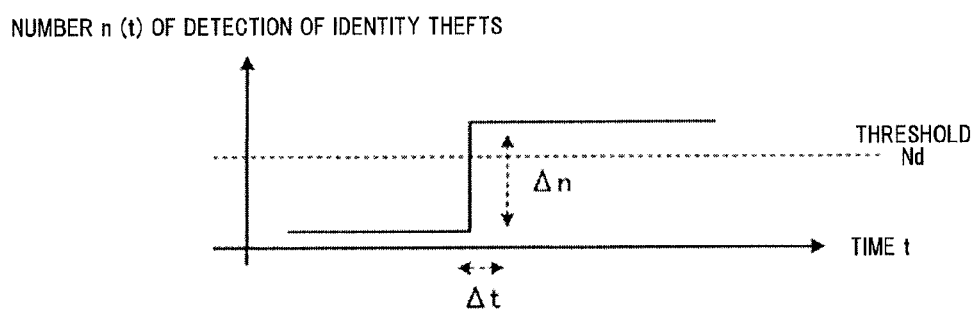

(Frequency of Identity Authentication Process of Case Where Identity Theft Is Detected) The frequency parameters (N(=N1), T, and M) of the identity verification may be changed in accordance with the number of times of detection of an identity theft. As illustrated in FIGS. 3(A) and 3(B), the process of counting the number of times (accumulated number of times) of detection of an identity theft according to an elapse of time will be considered. Here, the elapse time is denoted by t [s], and the number of times of detection of an identity theft is denoted by n (t). In a case where the number n (t) of times of detection of an identity theft exceeds a predetermined threshold Ns (FIG. 3(A)) or in a case where a change rate of the number n (t) of times of detection of an identity theft d (t)=$\Delta$n/$\Delta$t (here, $\Delta$n=n (t+$\Delta$t/

2)−n (t−Δt/2)) of the number n (t) of times of detection of an identity-theft exceeds a predetermined threshold Nd (FIG. 3(B)), the number of identity theft attacks is accumulated to be large or is concentrated at specific time to be large, and accordingly, a suspicious state is determined. At this time, the frequency parameters (N, T, and M) of the identity verification are increased so as to increase the frequency (repeating) of the identity authentication process, whereby the intensity of security is raised. In an opposite case, the frequency parameters (N, T, and M) of the identity verification are decreased so as to decrease the frequency of the identity authentication process, whereby the convenience is improved. In a case where the frequency parameters (N, T, and M) of the identity verification are changed, one of the parameters N, T, and M, an arbitrary combination thereof, or all thereof are changed.

In addition, the security may be strengthened by increasing the frequency parameters of the identity verification depending on a place at which the identity verification is performed. For example, in a region in which the security is bad or the like, in a case where identity verification is performed (or has been performed), the frequency parameters of the identity verification are controlled to be increased. In this way, in a case where intensity of the security needs to be raised, the frequency parameter of the identity verification is set to be large. In addition, in the case of identity authentication using a mobile terminal or the like, it may be configured such that, from a mobile terminal of a registrant who is an identity authentication target, location information is acquired using a GPS function included in the mobile terminal, and an identity theft is detected based on whether the acquired location and the location of a specific place at which identity authentication is actually to be performed coincide with each other. In this way, in a case where an identity theft is detected in accordance with the place at which the user is present, the frequency parameters of the identity verification are increased so as to raise the intensity of the security.

Figure 4:
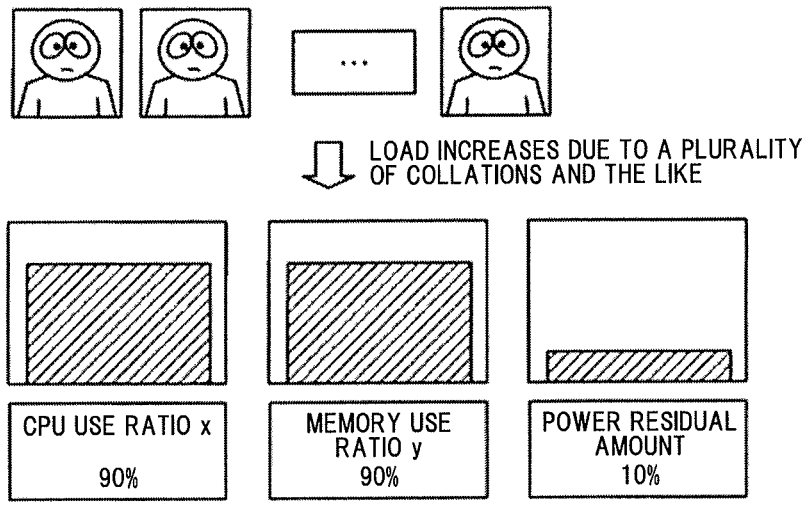
FIG. 4 is a diagram that illustrates the frequency of the identity authentication process of a case where convenience is degraded.

(Frequency of Identity Authentication of Case Where Convenience Is Degraded) As illustrated in FIG. 4, in consideration of a case where the load of the system increases in accordance with the identity authentication process or the like for many persons, the convenience e (x, y, z) of the system is defined based on a CPU operating ratio x [%], a memory use ratio y [%], and a battery residual amount z [%] of the identity authentication system 100, and, in a case where the convenience is less than a predetermined threshold E, the upper limit (threshold N) of the number of times of repeating the identity verification is set in accordance with the convenience e (x, y, z). Here, for example, the convenience e (x, y, z) can be defined as in the following equation.

$$e(x,y,z)=\exp(-ax)\cdot\exp(-by)\cdot\exp(c(100-z))$$

Here, exp ( ) is an exponential function, and a, b, and c>0 are coefficients (parameters) that are experimentally determined. At this time, the upper limit N (e (x, y, z)) (=N2) of the number of times of repeating the identity authentication process that is determined based on the convenience e (x, y, z) may be set to be in proportional to the convenience e (x, y, z) by using parameters p and q as coefficients as in the following equation. Here, the parameters p and q are experimentally determined.

$$N(e(x,y,z))=pe(x,y,z)+q$$

In the above-described equation, as the convenience e (x, y, z) decreases, the upper limit N of the number of times of repeating the identity authentication process is decreased. As a result, the load applied to the identity authentication system 100 is lowered, whereby the convenience e (x, y, z) is improved. In addition, by decreasing the upper limit N of the number of times of repeating the identity authentication process, the occurrence of erroneous detection according to the repeating of the identity authentication process can be suppressed, and the convenience of the identity authentication system 100 is also improved from this point.

In addition, in this example, in a case where the identity verification is performed at a specific facility using a commercial power supply not through a mobile terminal such as a mobile telephone, the battery residual amount z may be omitted from the parameters of the convenience. Furthermore, as the convenience e (x, y, z), different from the above-described example, when a processing time required for the identity authentication process is denoted by t, the convenience e (x, y, z) may be set to be increased as the processing time t decreases as in e (x, y, z)=1/t.

(Frequency of Identity Authentication Process in Consideration of Tradeoff Between Intensity of Security and Convenience) For the number N1 (described above) of times of repeating the identity authentication process that is determined for acquiring a sufficient security level and the number N2 (described above) of times of repeating the identity authentication process that is determined in consideration of the convenience, for example, by using a parameter λ (here, 0≤λ≤1), when N that is one of the frequency parameters of the identity verification is determined by performing internal division of N1 and N2 as N=λN1+(1−λ)N2, a tradeoff between the intensity of security and the convenience can be considered.

In this embodiment, by setting λ in consideration of the required intensity of the security and the convenience, N that is one of the frequency parameters is determined, and the value (an integer value) thereof is determined. While λ may be manually set, for example, the collation timing control unit 104 may be configured to set λ such that, first, as N, the value (N2) determined in consideration of the convenience (a predetermined load level applied to the identity authentication system 100) is used, and N gradually approaches the value (N1) determined in consideration of the intensity of security in accordance with the accumulated number of times of detection of an identity theft.

(Change in Processing Content of Identity Authentication Process) By changing a specific processing content of the identity authentication process, the accuracy of the identity verification can be improved. Regarding this, there are the following methods.

Figure 5:
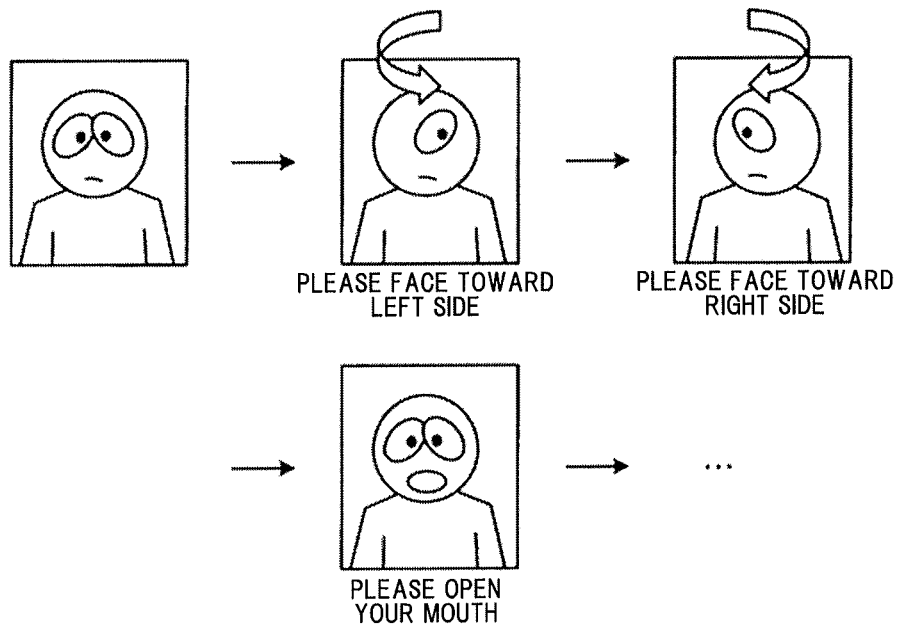

(1) A person who is an identity authentication target is requested to perform operations of moving the face, opening/closing the eyes, shaking the hand, smiling, opening/closing the mouth, and the like, requested face images are acquired, and the identity authentication process is performed using a plurality of images that have been acquired (FIG. 5).

(2) By increasing the resolution of an input image, the identity authentication process is performed using an image having a better condition.

(3) By increasing the frame rate of an input image so as to acquire a moving image having a small change between frames, the identity authentication process is stabilized.

(4) By increasing the number of input images, information used for the identity authentication process is increased.

(5) By using high-dimension features (for example, subspaces of a high dimension or the like) having higher accuracy as is necessary, the identity authentication process is performed.

(6) Thresholds used in the identity authentication process are set to be large.

As above, the first embodiment has been described. Since the identity authentication system 100 according to this embodiment can achieve both the strengthening of the security and the maintenance of the convenience (the efficiency of the system), for example, the identity authentication system can be appropriately applied to identity verification in an e-commerce system using a mobile terminal or the like. In addition, the identity authentication system 100 according to this embodiment is appropriate for the use of identity authentication performed in a specific facility.

Second Embodiment

Figure 6:
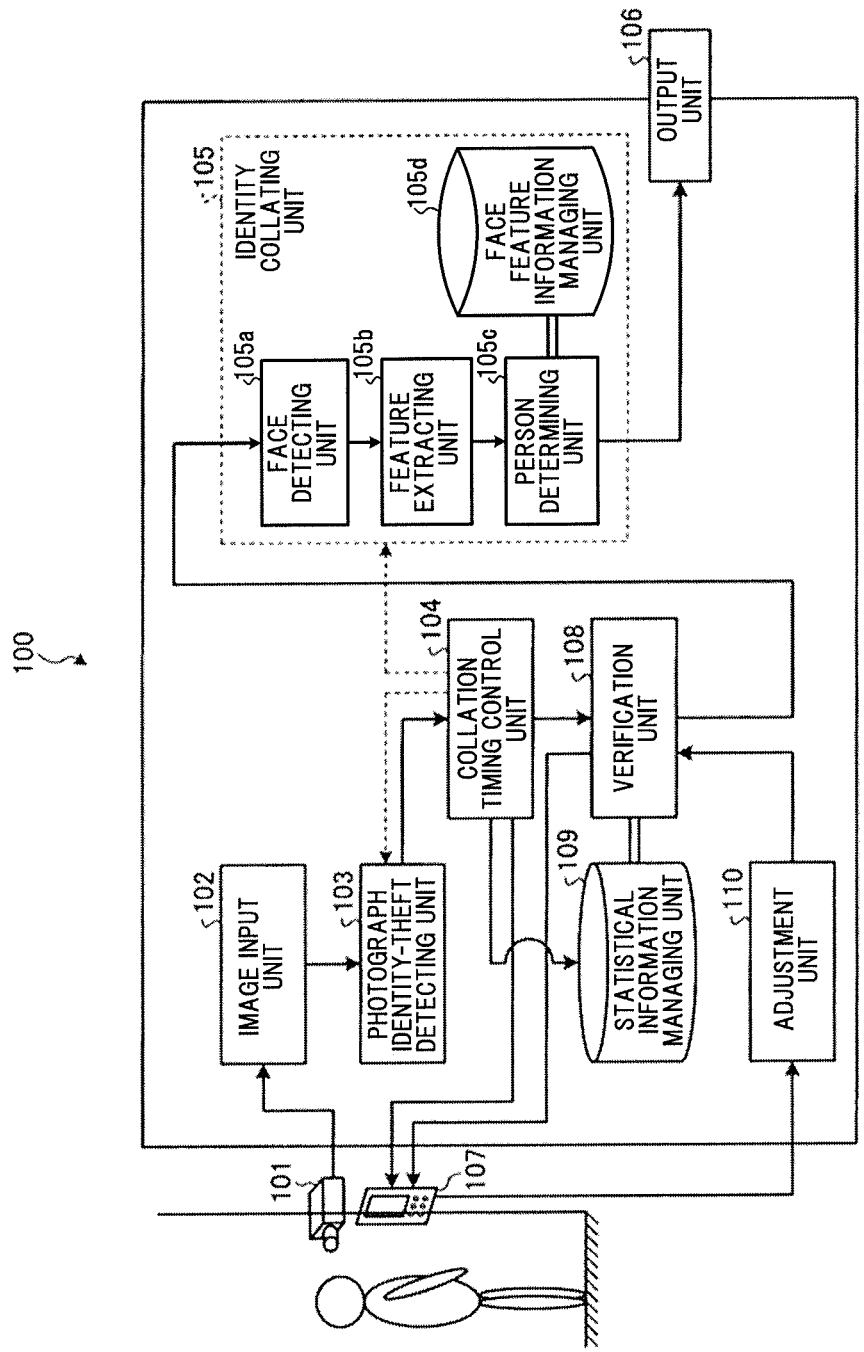
FIG. 6 is a block diagram that illustrates an identity authentication system according to a second embodiment.

According to this embodiment, different from the first embodiment, identity verification is further performed using a second identity verifying means other than the means (the identity collating unit 105) for identity authentication that is normally performed in accordance with the frequency of the detection of an identity theft, the identity theft is prevented. This embodiment can be applied to identity authentication performed in a terminal or a mobile terminal used in an e-commerce system as well. Since the basic configuration and the operations are similar to those of the first embodiment, only a statistical information managing unit 109, a verification unit 108, and an adjustment unit 110 that are added to this embodiment and are distinctive constituent elements will be described. FIG. 6 is a block diagram that illustrates an identity authentication system 100 according to the second embodiment.

Similar to the first embodiment, in a case where repeated identity thefts are detected, it is preferable to configure the security to be stricter, and, in a case where the frequency of the identity theft is low, the security may be lowered as that much. In this embodiment, when a repeated identity theft is detected, instead of processing to the identity collating processing immediately after the detection of the identity theft as in the first embodiment, an identity theft is detected by a second identity verifying means (the statistical information managing unit 109 and the verification unit 108).

Figures 7, 8:
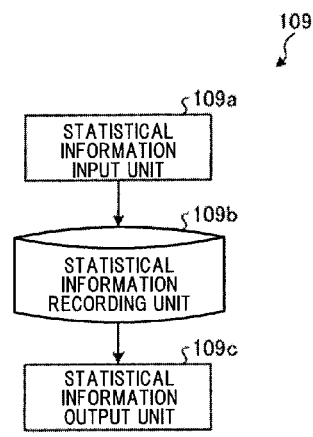
FIG. 7 is a diagram that illustrates the configuration of a statistical information managing unit.
FIG. 8 is a diagram that illustrates an example of information (history information) recorded as a behavior pattern of a registrant.
Figure 9:
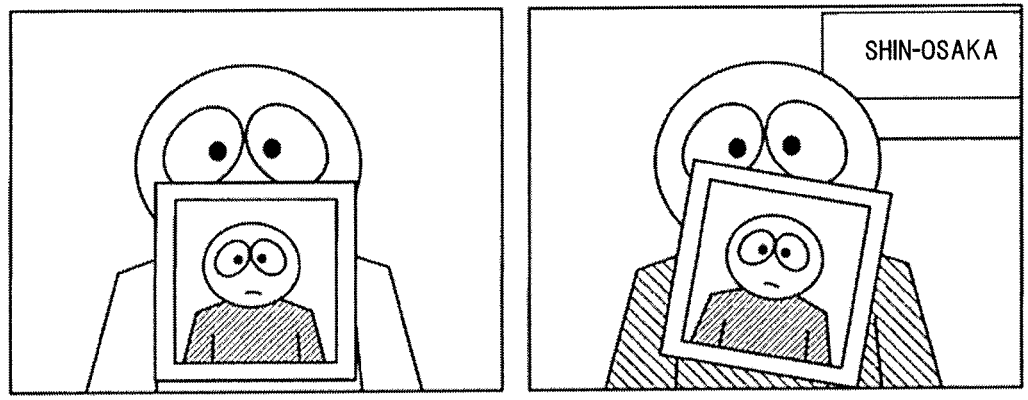
FIG. 9 is a diagram that illustrates an example of an identity theft detection result recorded in the statistical information managing unit.

(Prevention of Identity Theft Based On User's Behavior Pattern) FIG. 7 is a diagram that illustrates the configuration of the statistical information managing unit 109. The statistical information managing unit 109 is configured by a statistical information input unit 109a, a statistical information recording unit 109b, and a statistical information output unit 109c. The collation timing control unit 104 inputs information relating to a user's behavior pattern to the statistical information recording unit 109b from the statistical information input unit 109a. As the information (history information) recorded as registrant's behavior pattern, there are a user ID (for example, identification information of a mobile terminal used by the user or the like), use date, use time, a place of the use, a result of detection of identity thefts (a result of detection of identity thefts or the accumulated number of times of detection) (FIG. 8). In addition, the result (FIG. 9) of past detection of identity thefts including the input image is also recorded. In this embodiment, such information is assumed to be collected by the collation timing control unit 104. In addition, the statistical information output unit 109c outputs the history information such as the behavior pattern recorded in the statistical information recording unit 109b to the verification unit 108 in accordance with a request from the verification unit 108.

The verification unit 108 performs an estimation process for estimating an identity theft or not based on the user's behavior pattern that is known from the information recorded in the statistical information managing unit 109. For example, based on the behavior pattern of a user "000000" illustrated in FIG. 8, while the time of identity authentication and the time of another identity authentication approach each other, the locations at which the user is present at the time of identity authentication and the time of another identity authentication are located far from each other, and accordingly, an identity theft may be estimated (in this case, the identity authentication fails). In addition, in a case where the use time or the place of the use of the identity authentication is statistically far apart from a normal behavior pattern of the registered user, an identity theft may be estimated. As above, an identity theft can be estimated based on the user's behavior pattern. In addition, in a case where an identity theft is estimated based on the behavior pattern by the verification unit 108, the collation timing control unit 104 sets the frequency parameters of the identity verification so as to raise the intensity of the security. In addition, the verification unit 108 may avoid a bias in the estimation process due to a small amount of data by performing the estimation process for estimating an identity theft or not by using the behavior patterns of the user only in a case where the number of pieces of the history information of the registrant who is the identity authentication target is sufficiently large.

(Conversion of Identity Verification Function) The adjustment unit 110 switches between use/no-use of the verification unit 108 in accordance with a determination of a user such as a supervisor. As is necessary, the user may invalidate the function of the verification unit 108 using the adjustment unit 110 through the display/operation unit 107 so as to prioritize the convenience (efficiency).

(Identity Authentication Using Additional Means) The verification unit 108 also performs identity authentication as an additional means of a case where the identity authentication process is not successful. For example, by receiving an input of a password registered in advance through the display/operation unit 107, the identity authentication may be performed. Alternatively, the identity authentication may be performed using a physical medium for specifying a person such as a magnetic card, an IC card, an RFID tag, or a key. Alternatively, a notification to a person through an electronic mail or a phone call may be made from the verification unit 108 through a communication interface not illustrated in the figure. As described above, in a case where a password or a physical medium is used, a card reader, a tag reader, or a key corresponding thereto is arranged in the display/operation unit 107 or the like. In this example, a password of a registrant, information relating to the physical medium used for specifying a person such as a magnetic card, an IC card, an RFID tag, or a key, an electronic mail address, a telephone, and the like are recorded in the statistical information recording unit 109b of the statistical information managing unit 109. The recorded information is referred to when the password is input, when the collation process is performed in a case where the physical medium is used, or when the electronic mail or phone call is originated.

While several embodiments of the prevent invention have been described, such embodiments are presented as merely examples but are not for the purpose of limiting the scope of the present invention. These new embodiments can be performed in other various forms, and various omissions, substitutions and changes may be made therein in a range not departing from the concept of the present invention. These embodiments and modifications thereof belong to the scope and the concept of the present invention and belong to the scope of the invention described in the claims and equivalents thereof.

What is claimed is:

1. An identity authentication system comprising:
a detector that detects an identity theft by determining whether a photographing target is a living body or a non-living body;
a collator that performs identity collation based on a photographed image; and
a controller that limits execution timing of a detection process performed by the detector and an identity collating processing performed by the collator; and
in response to the determination that the detection performed by the detector is performed for a first number of times, performs the collation process performed by the collator;
the controller further performs:
uses the first number of times that is set in accordance with a predetermined load level applied to the identity authentication system relating to convenience;
gradually changes the first number of times to approach a number of times that is set in accordance with a required intensity of security, in accordance with an accumulated number of times of detection of an identity theft performed by the detector;
in response to the detector detects an identity theft, causes the collating unit to perform identity collation;
in response to the determination that identity collation corresponding to a second number of times is successful within a predetermined time, determines that identity verification is made;
in response to determination that the intensity of the security is raised, increases the first number of times, the second number of times, or the predetermined time; and
in response to determination that the convenience is improved, decreases the first number of times, the second number of times, or the predetermined time.

2. The identity authentication system according to claim 1, wherein the controller, when the detector detects an identity theft, causes the collator to perform identity collation and, in a case where identity collation corresponding to the second number of times is not successful within a predetermined time, performs the detection performed by the detector again.

3. The identity authentication system according to claim 1, wherein the detection performed by the detector and the identity collation performed by the collating unit are performed based on the photographed images that are configured by a plurality of mutually-different images.

4. The identity authentication system according to claim 1, wherein the controller sets the first number of times, the second number of times, or the predetermined time in accordance with the accumulated number of times of the detection of the identity theft that is performed by the detector.

5. The identity authentication system according to claim 1, wherein the controller sets the first number of times, the second number of times, or the predetermined time in accordance with a detection place of the identity theft that is detected by the detector.

6. The identity authentication system according to claim 1, further comprising:
a recorder that records a use history of the user when identity authentication is performed by the identity authentication system; and an identifier that estimates an identity theft based on a behavior pattern of the user that is based on the use history recorded in the recorder.

7. The identity authentication system according to claim 6, wherein the photographed image is included as information of the use history, and wherein the identifier detects an identity theft based on a difference between a background of the photographed image that is photographed this time and the photographed image recorded as the use history when the identity authentication is performed at a specific place.

8. An identity authentication method comprising:
detecting, by a detector, an identity theft by determining whether a photographing target is a living body or a non-living body;
performing, by a collator, identity collation based on a photographed image;
limiting, by a controller, execution timing of a detection process performed by the detector and an identity collating processing performed by the collator;
in response to the determination that the detection is performed for a first number of times, performing, by a collator, the collation process;
using the first number of times that is set in accordance with a predetermined load level relating to convenience;
gradually changing the first number of times to approach a number of times that is set in accordance with a required intensity of security, in accordance with an accumulated number of times of detection of an identity theft;
in response to detecting an identity theft, identity collation is performed;
in response to collation corresponding to a second number of times is successful within a predetermined time, determining that identity verification is made;
in response to determination that the intensity of the security is raised, increasing the first number of times, the second number of times, or the predetermined time; and
in response to determination that the convenience is improved, decreasing the first number of times, the second number of times, or the predetermined time.

9. The identity authentication method according to claim 8, wherein when an identity theft is detected, identity collation is performed and, in a case where identity collation corresponding to the second number of times is not successful within a predetermined time, the detection performed again.

10. The identity authentication method according to claim 8, wherein the detection and the identity collation are performed based on the photographed images that are configured by a plurality of mutually-different images.

11. The identity authentication method according to claim 8, wherein first number of times, the second number of times, or the predetermined time are set in accordance with the accumulated number of times of the detection of the identity theft.

12. The identity authentication method according to claim 8, wherein first number of times, the second number of times, or the predetermined time are set in accordance with a detection place of the identity theft.

13. The identity authentication method according to claim 8, further comprising: recording a use history of the user when identity authentication is performed and estimating an identity theft based on a behavior pattern of the user that is based on the recorded use history.

* * * * *